United States Patent Office 3,118,918
Patented Jan. 21, 1964

3,118,918
NEW 12α-HALOGEN-PREGNENES AND PREGNANES
Albert Wettstein and Julius Schmidlin, Basel, Switzerland, assignors to Ciba Corporation, a corporation of Delaware
No Drawing. Filed Aug. 30, 1956, Ser. No. 606,979
Claims priority, application Switzerland Nov. 19, 1952
9 Claims. (Cl. 260—397.45)

This is a continuation-in-part of our copending application Serial No. 392,982, filed November 18, 1953, now U.S. Patent No. 2,986,560. Patent application Serial No. 392,982 describes and claims a process for the manufacture of compounds of the steroid series, namely 11β-hydroxy-12α-halogen-steroids, wherein an 11α-halogen-12-oxo-steroid is treated with a complex hydride of an amphoteric metal, the resulting 11α,12β-halogen-hydrin is subjected to the action of an agent capable of splitting off hydrogen halide, and the 11,12β-oxide obtained is split up by means of hydrohalic acid to form an 11β-hydroxy-12α-halogen-steroid.

The present invention relates to Δ⁴-3,11,20-trioxo-12α-halogen-pregnenes and Δ⁴-3,20-dioxo - 11β - hydroxy-12α-halogen-pregnenes of which the halogen atom in 12-position is a fluorine or chlorine atoms, preferably Δ⁴-3,20-dioxo-11β-hydroxy-12α-halogen-pregnenes of the formula

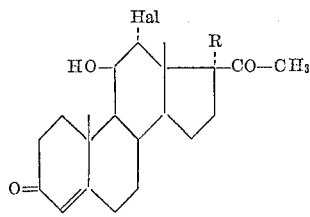

in which R is a hydrogen atom or a hydroxy group, and Hal indicates fluorine or chlorine and the manufacture thereof.

These new compounds possess valuable pharmacological properties; thus they have therapeutically useful effects upon pathological tissue functions and are intended for application as medicaments in cases of corresponding diseases. They can, however, also be used as intermediate products for the manufacture of therapeutically valuable compounds, especially of the 21-oxygenated derivatives, by treating them for example, with oxidising enzymes of *Ophiobolus herpotrichus*, for example according to the copending process of application Serial No. 518,922, filed June 29, 1955, now U.S. Patent No. 2,778,776, by Albert Wettstein et al., and if desired eliminating the 12-halogen atom by reduction.

The new halogen-pregnenes of the invention are obtained according to the process of our above mentioned copending application Serial No. 392,982 of November 18, 1953, when 11,12β-epoxides of Δ⁴-3,20-dioxopregnenes of the formula

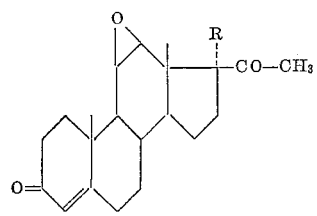

in which R has the meaning given above, are treated with hydrofluoric or hydrochloric acid. The reaction is carried out in an anhydrous or aqueous medium, for example in aqueous dioxane.

The starting materials can be prepared by the process of our above mentioned copending application Serial No. 392,982 for example starting from 11α-bromo-12-oxo-pregnanes which contain an esterified hydroxyl group in both of the 3- and 20-positions, the conversion of 3- and 20-hydroxyl groups into oxo groups and the introduction of a double bond in 4,5-position being effected according to methods known per se.

The following examples illustrate the invention, the relation between part by weight and part by volume being the same as that between the gram and the cubic centimeter.

*Example 1*

0.995 part by weight of 3α:20-diacetoxy-11α-bromo-12 - oxo - pregnane (prepared from 3α:12α-diacetoxy-20-oxo-pregnane by reduction with sodium boro-hydride, conversion of the resulting triol into the 3α:20-diacetate, oxidation by means of chromic acid to the 3α:20-diacetoxy-12-keto-pregnane and bromination of the latter in 11-position) is dissolved in 12.5 parts by volume of anhydrous tetrahydrofurane and at 0° C. with stirring, within 30 minutes, 7.5 parts by volume of a 2-molar solution of lithium boro-hydride in tetrahydrofurane added dropwise. After a reaction period of 4 hours, the reaction mixture is poured into 30 parts by volume of ice-cooled 0.5 N-acetic acid and when the evolution of hydrogen is completed the tetrahydrofurane is distilled off under vacuum as far as possible. The precipitated reaction product, after 48 hours standing, is finely crushed, collected on a suction filter, thoroughly washed with water and dried over calcium chloride under vacuum. The resulting 3α:20-diacetoxy-11α-bromo-12β-hydroxy-pregnane (0.980 part by weight equals 98% of the theoretical yield) is used directly for further working up.

0.980 part by weight of the above crude 3α:20-diacetoxy-11α-bromo-12β-hydroxy-pregnane is dissolved in 75 parts by weight of methanol and mixed in a nitrogen atmosphere with 25 parts by volume of a 2-molar solution of potassium hydroxide in methanol. After 72 hours' standing at room temperature, the reaction mixture is carefully neutralised with stirring by the addition of 25 parts by volume of 2 N-hydrochloric acid and the precipitated crude product, after addition of 10 parts by volume of water, is filtered with suction, carefully washed with water and dried under vacuum over phosphorus pentoxide. 0.632 part by weight (96% of the theoretical yield) of crude 3α:20-dihydroxy-11:12β-oxido-pregnane results which is practically halogen-free.

0.632 part by weight of this crude 3α:20-dihydroxy-11:12β-oxido-pregnane is covered with 125 parts by volume of toluene and 20 parts by volume of cyclohexanone and after distilling off 25 parts by volume of solvent, 0.817 part by weight of aluminium isopropylate is added and the whole boiled for 2 hours with exclusion of moisture. Thereupon 50 parts by volume of molar Rochelle salt solution are added and the volatile fractions distilled off with steam. After cooling, the reaction product is taken up in an ether-benzene mixture (3:1), and the solution washed with molar Rochelle salt solution and water, dried with sodium sulphate and evaporated. The residue is chromatographed over 25 parts by weight of alumina by the fractional elution method. From the fractions dissolved out with hexane-benzene mixtures (3:1), (1:1) and (1:3) there is obtained by crystallisation from ether-petroleum ether a total of 0.287 part by weight (46% of the theoretical yield) of 3:20-diketo-11:12β-oxido-pregnane of M.P. 149–152° C. $[\alpha]_D^{22} = +102° \pm 4°$ (c.=1,109 in chloroform).

A solution of 0.661 part by weight of 3:20-dioxo-11:12β-oxido-pregnane in 35 parts by volume of peroxide-free dioxane is mixed with 5 parts by volume of 4 N-hydrobromic acid and the whole allowed to stand for 2 hours at room temperature. Thereupon 20 parts by volume of water are carefully added, whereby the reaction product is precipitated in crystalline form. After standing for 30 minutes, the whole is filtered with suction and the residue thoroughly washed with water and dried under vacuum over phosphorus pentoxide and potassium hydroxide. By recrystallisation from methylene chloride-acetone there is obtained a total of 0.685 part by weight (83% of the theoretical yield) of 3:20-diketo-11β-hydroxy-12α-bromo-pregnane in colourless leaflets of M.P. 240–243° C. (with decomposition).

Into a solution of 0.371 part by weight of 3:20-diketo-11β-hydroxy-12α-bromo-pregnane in 6 parts by volume of glacial acetic acid there is introduced at room temperature a small quantity of a 25% solution of hydrobromic acid in glacial acetic acid and subsequently, in portions, 0.14 part by weight of bromine in 2.05 parts by volume of glacial acetic acid. When the addition is complete, stirring is continued for about 10 minutes. The reaction mixture is now poured into ice-water and extracted with chloroform. The chloroform solution, after washing with water and drying, leaves after evaporation under vacuum 0.45 part by weight of 4-bromo-3:20-diketo-11β-hydroxy-12α-bromo-pregnane. The bromide is dissolved in 14 parts by volume of chloroform and treated with 0.3 part by weight of semicarbazide and 24 parts by volume of tertiary butanol. Carbon dioxide gas is passed into the mixture, which is shaken from time to time. A small fraction of the semicarbazide does not pass into solution. The reaction mixture becomes coloured after about 5 minutes, the maximum of the colouration being attained after about 10 minutes. After a further 20 minutes the colouration is less intensive and 60 minutes later has almost completely disappeared. After this time practically the whole of the semicarbazide is dissolved. After a further 40 minutes, the reaction mixture is evaporated under vacuum.

To a solution of the residue in 10 parts by volume of glacial acetic acid and 4 parts by volume of water is added 0.2 part by volume of a 1.6 N-pyroracemic acid solution and the reaction vessel is rinsed out with carbon dioxide gas and sealed tightly. After 17 hours, the reaction mixture is poured into cold water, the deposited precipitate taken up in ether and the ethereal solution washed with water, sodium bicarbonate solution, 2% sodium carbonate solution and water, dried and the solvent evaporated. By recrystallisation of the residue from methanol, Δ⁴-3:20-diketo-11:12β-oxido-pregnene is obtained. A double bond can be introduced, if desired, into the 1,2-position of this compound, for example by treatment with oxidising enzymes of *Didymella lycopersici*.

0.21 part by weight of the above Δ⁴-3:20-diketo-11:12β-oxido-pregnene is dissolved in 19 parts by volume of dioxane and the solution mixed with 5 parts by volume of aqueous 2.5 N-hydrochloric acid and the whole allowed to stand for 1 hour at room temperature. Then in the course of 10 minutes, with rinsing round, about 15 parts by volume of water are added. The separated crystals are filtered off with suction after some time, washed with aqueous dioxane and water and then dried under vacuum over phosphorus pentoxide and potassium hydroxide. By a single recrystallisation from ether with the use of methylene chloride as solution promoter, the Δ⁴-3:20-diketo-11β-hydroxy-12α-chloro-pregnene is obtained.

When Δ⁴-3:20-diketo-11:12β-oxido-pregnene is reacted in an analogous manner with hydrofluoric acid, Δ⁴-3:20-diketo-11β-hydroxy-12α-fluoro-pregnene is obtained.

In an analogous manner, from Δ¹·⁴-3:20-diketo-11:12β-oxido-pregnadiene, Δ¹·⁴-3:20-diketo-11β-hydroxy-12α-chloro-pregnadiene and also Δ¹·⁴-3:20-diketo-11β-hydroxy-12α-fluoro-pregnadiene are obtained.

*Example 2*

10 grams of 3,12,20-trioxo-17α-hydroxy-pregnane, 30 cc. of ethylene glycol and 300 cc. of benzene are refluxed for 4 hours with 100 mg. of para-toluene sulfonic acid, the water which forms being continuously distilled off azeotropically. The reaction mixture is cooled, mixed with ethyl acetate, the organic solution is washed with water, dried, and evaporated. The 3,20-bis-ethylenedioxy-12-oxo-17α-hydroxy-pregnane obtained as residue is recrystallized from ethyl acetate.

8 grams of the 3,20-diketal are dissolved in 50 cc. of glacial acetic acid together with 6 grams of sodium acetate. A solution of 3.24 grams of bromine in 50 cc. of glacial acetic acid is added dropwise while the whole is being stirred, and the reaction mixture, which is red at first and then slightly yellow, is poured into 1 liter of water. The 3,20 - bis-ethylenedioxy-12-oxo-11α-bromo-17α-hydroxy-pregnane which precipitates is filtered off with suction, washed with water, and dried over phosphorus pentoxide in vacuo. The bromide thus obtained is dissolved in 100 cc. of tetrahydrofurane. In the course of 30 minutes and while stirring, there is added dropwise to this solution a solution of 1 gram of lithium borohydride in 50 cc. of tetrahydrofurane. After 2 hours the reaction mixture is carefully mixed with water, acidified with dilute acetic acid and the evolution of hydrogen is allowed to subside. After that, the tetrahydrofurane is evaporated under reduced pressure. The residue is filtered with suction and washed thoroughly with water. The resulting crude product (3,20-bis-ethylenedioxy-12β,17α-dihydroxy-11α-bromo-pregnane) is dissolved while still wet in 100 cc. of glacial acetic acid, the solution mixed with 20 cc. of water and 0.2 cc. of pyruvic acid and the whole heated on the boiling water bath for 30 minutes. The solution is then considerably concentrated in vacuo. The residue is taken up in ethyl acetate, the ethyl acetate solution washed with dilute caustic soda solution and water, dried, and evaporated. The resulting 3,20-dioxo-12β,17α-dihydroxy-11α-bromo-pregnane is then dissolved in 200 cc. of methanol and the solution mixed in a nitrogen atmosphere with a solution of 5 grams of potassium hydroxide in 100 cc. of methanol. After having been allowed to stand at 20° C. for 3 days, the reaction mixture is carefully neutralized with acetic acid while being stirred. The solution is then poured into 3 liters of water, the precipitated crude product is filtered off with suction, washed thoroughly with water and dried over phosphorus pentoxide under reduced pressure. The resulting 3,20-dioxo-11,12β-oxido-17α-hydroxy-pregnane contains but traces of halogen.

2 grams of this crude 3,20-dioxo-11,12β-oxido-17α-hydroxy-pregnane are dissolved in 50 cc. of alcohol-free chloroform. Then, for 4 hours at 0° C., a weak current of hydrogen bromide is passed into the solution, which is then washed with water, dried and evaporated. The crystalline mass of 3,20-dioxo-11β,17α-dihydroxy-12α-bromo-pregnane remaining behind is dissolved in 50 cc. of glacial acetic acid. While being stirred, this solution is mixed, first with 1 drop of a concentrated solution of hydrogen bromide in glacial acetic acid, and then slowly with a solution of 1.01 grams of bromine in 20 cc. of glacial acetic acid. Stirring is continued until the solution becomes pale yellow. The reaction mixture is then poured into ice water and the aqueous suspension extracted by shaking with ethyl acetate. The ethyl acetate solution is washed with water, dried and evaporated under reduced pressure. The 2.7 grams of 3,20-dioxo-11β,17α-dihydroxy-4,12α-dibromo-pregnane obtained as residue are dissolved in 100 cc. of chloroform and the solution mixed in an atmosphere of carbonic acid with 2.7 grams of semicarbazide and 120 cc. of tertiary butanol. On slight shaking, the solution gradually assumes a strong color in the course of 10 minutes; after 1 hour it is pale again. After a total of 2 hours, the reaction mixture is evaporated in vacuo and immediately dissolved, in an atmosphere of carbonic acid, in a mixture of 100 cc. of glacial acetic acid, 40 cc. of water, and 2 cc. of a 2 N-pyruvic acid solution. The closed vessel is allowed to stand at 20° C. for 24 hours, the reaction mixture then poured into water, and the resulting suspension is extracted by shaking with ethyl acetate. The ethyl acetate solution is washed with dilute caustic soda solution and water, dried and evaporated. By recrystallizing the residue from acetone-isopropyl ether mixtures there is obtained the $\Delta^4$-3,20-dioxo-11,12$\beta$-oxido-17$\alpha$-hydroxy-pregnene.

1 gram of the above $\Delta^4$-3,20-dioxo-11,12$\beta$-oxido-17$\alpha$-hydroxy-pregnene is dissolved in 100 cc. of alcohol-free chloroform, 1 gram of hydrogen fluoride is introduced at 0° C. and the reaction mass allowed to stand at that temperature for 5 hours. The solution is then washed with water, dried, and evaporated under reduced pressure. The residue is $\Delta^4$-3,20-dioxo-11$\beta$,17$\alpha$-dihydroxy-12$\alpha$-fluoro-pregnene.

*Example 3*

10 grams of the 3.20-dioxo-11,12$\beta$-oxido-17$\alpha$-hydroxy-pregnane described in Example 2 are dissolved in 500 cc. of alcohol-free chloroform, 10 grams of hydrogen fluoride introduced at 0° C., and the reaction mass allowed to stand at that temperature for 5 hours. The solution is then washed with water, dried and evaporated under reduced pressure. The residue is 3,20-dioxo-11$\beta$,17$\alpha$-dihydroxy-12$\alpha$-fluoro-pregane.

If there is used in this example hydrochloric acid instead of hydrofluoric acid the 3,20-dioxo-11$\beta$,17$\alpha$-dihydroxy-12$\alpha$-chloro-pregnane is obtained.

*Example 4*

1 gram of the $\Delta^4$-3,20-dioxo-11$\beta$,17$\alpha$-dihydroxy-12$\alpha$-fluoro-pregnene described in Example 2 is dissolved in 10 cc. of a 1:1 mixture of pyridine and water. The solution is mixed with 0.2 gram of chromium trioxide and allowed to stand at 20° C. for 24 hours. Some sodium bisulfite is then added and the mixture diluted with ethyl acetate. The ethyl acetate solution is washed with dilute hydrochloric acid, water, dilute caustic soda solution, and water, dried, and evaporated. The residue is $\Delta^4$-3,11,20-trioxo-12$\alpha$-fluoro-17$\alpha$-hydroxy-pregnene.

*Example 5*

1 gram of the 3,20-dioxo-11$\beta$,17$\alpha$-dihydroxy-12$\alpha$-fluoro-pregnane described in Example 3 is dissolved in 10 cc. of a 1:1 mixture of pyridine and water. The solution is mixed with 0.2 gram of chromium trioxide and then allowed to stand at 20° C. for 24 hours. Some sodium bisulfite is then added and the mixture diluted with ethyl acetate. The ethyl acetate solution is washed with dilute hydrochloric acid, water, dilute caustic soda solution and water, dried and evaporated. The residue is 3,11,20-trioxo-12$\alpha$-fluoro-17$\alpha$-hydroxy-pregnane.

*Example 6*

1 gram of the 3,20-dioxo-11,12$\beta$-oxido-pregnane described in Example 1 are dissolved in 500 cc. of alcohol-free chloroform, 10 grams of hydrogen fluoride introduced at 0° C., and the reaction mass allowed to stand at that temperature for 5 hours. The solution is then washed with water, dried, and evaporated under reduced pressure. The residue is 3,20-dioxo-11$\beta$-hydroxy-12$\alpha$-fluoro-pregnane.

If in this example there is used hydrochloric acid instead of hydrofluoric acid, the 3,20-dioxo-11$\beta$-hydroxy-12$\alpha$ chloro-pregnane is obtained.

What is claimed is:
1. A compound of the formula

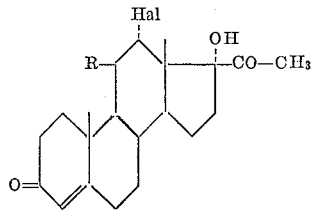

in which Hal is a member selected from the group consisting of a fluorine and a chlorine atom and R is a member selected from the group consisting of a $\beta$-hydroxy group and an oxo group.

2. $\Delta^4$ - 3,20 - dioxo - 11$\beta$,17$\alpha$ - dihydroxy - 12$\alpha$ - fluoro-pregnene.

3. $\Delta^4$ - 3,11,20 - trioxo - 17$\alpha$ - hydroxy - 12$\alpha$ - fluoro-pregnene.

4. A compound of the formula

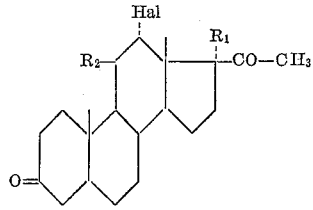

in which Hal is a member selected from the group consisting of a fluorine and a chlorine atom, $R_1$ a member selected from the group consisting of hydrogen and a hydroxy group and $R_2$ a member selected from the group consisting of a $\beta$-hydroxy group and an oxo group.

5. 3,20-dioxo-11$\beta$,17$\alpha$-dihydroxy-12$\alpha$-fluoro-pregnane.
6. 3,20-dioxo-11$\beta$,17$\alpha$-dihydroxy-12$\alpha$-chloro-pregnane.
7. 3,11,20-trioxo-12$\alpha$-fluoro-17$\alpha$-hydroxy-pregnane.
8. 3,20-dioxo-11$\beta$-hydroxy-12$\alpha$-fluoro-pregnane.
9. 3,20-dioxo-11$\beta$-hydroxy-12$\alpha$-chloro-pregnane.

References Cited in the file of this patent

UNITED STATES PATENTS

| | | |
|---|---|---|
| 2,403,683 | Reichstein | July 9, 1946 |
| 2,541,074 | Kendall | Feb. 13, 1951 |
| 2,790,814 | Hogg et al. | Apr. 30, 1957 |
| 2,963,492 | Fried et al. | Dec. 6, 1960 |

OTHER REFERENCES

Herz et al.: J. Am. Chem. Soc., vol. 78 (May 5, 1956), pages 2017 and 2018.